US006879414B2

(12) United States Patent
Ando

(10) Patent No.: US 6,879,414 B2
(45) Date of Patent: Apr. 12, 2005

(54) SCANNER UNIT AND CARRIAGE THEREFOR

(75) Inventor: Koichi Ando, Kamakura (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 774 days.

(21) Appl. No.: 09/773,531

(22) Filed: Feb. 2, 2001

(65) Prior Publication Data

US 2002/0106217 A1 Aug. 8, 2002

(51) Int. Cl.[7] ................................. H04N 1/04
(52) U.S. Cl. ............... 358/474; 349/64; 358/509; 399/211
(58) Field of Search ............... 349/64, 59, 70; 358/400, 401, 448, 474, 480, 296, 509; 315/100; 180/8.1; 606/87

(56) References Cited

U.S. PATENT DOCUMENTS

| | | | | |
|---|---|---|---|---|
| 2,923,854 A | * | 2/1960 | Banios | 315/100 |
| 4,765,424 A | * | 8/1988 | Daley | 180/8.1 |
| 5,653,714 A | * | 8/1997 | Dietz et al. | 606/87 |
| 5,920,408 A | * | 7/1999 | Nagano | 358/509 |

FOREIGN PATENT DOCUMENTS

| | | | | |
|---|---|---|---|---|
| JP | 362113595 A | * | 5/1987 | B41M/5/26 |
| JP | 9-244156 | | 9/1997 | |

* cited by examiner

Primary Examiner—Edward Coles
Assistant Examiner—Heather D. Gibbs
(74) Attorney, Agent, or Firm—Foley & Lardner LLP

(57) ABSTRACT

A scanner unit has first and second carriages under an original table glass. The first carriage has a first frame extending from a front side to a rear side along the original table, that is, in a main scan direction. Two rails for supporting both end portions of the first frame such that the first frame may slide in a sub-scan direction are provided on the front side and rear side of the scanner unit. A cold cathode fluorescent lamp is mounted on the first frame. In order to make a high-voltage-side harness of the cold cathode fluorescent lamp as short as possible, an inverter circuit board, which is a lighting circuit, is disposed as close as possible to a positive electrode of the cold cathode fluorescent lamp. A weight is attached on a side opposite to the inverter circuit board, thereby to stabilize a weight balance of the first frame in the main scan direction.

12 Claims, 4 Drawing Sheets

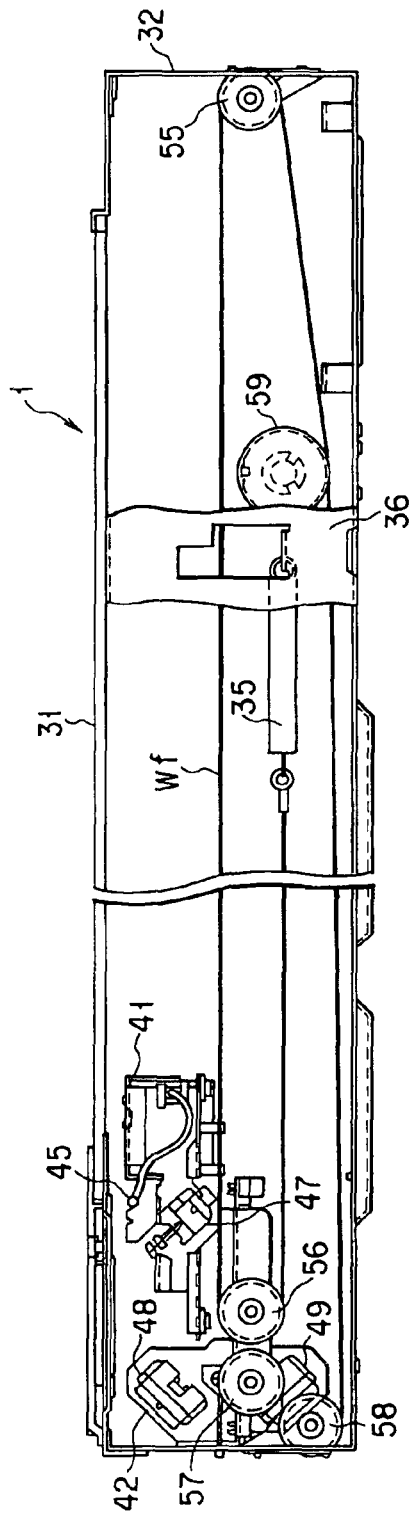
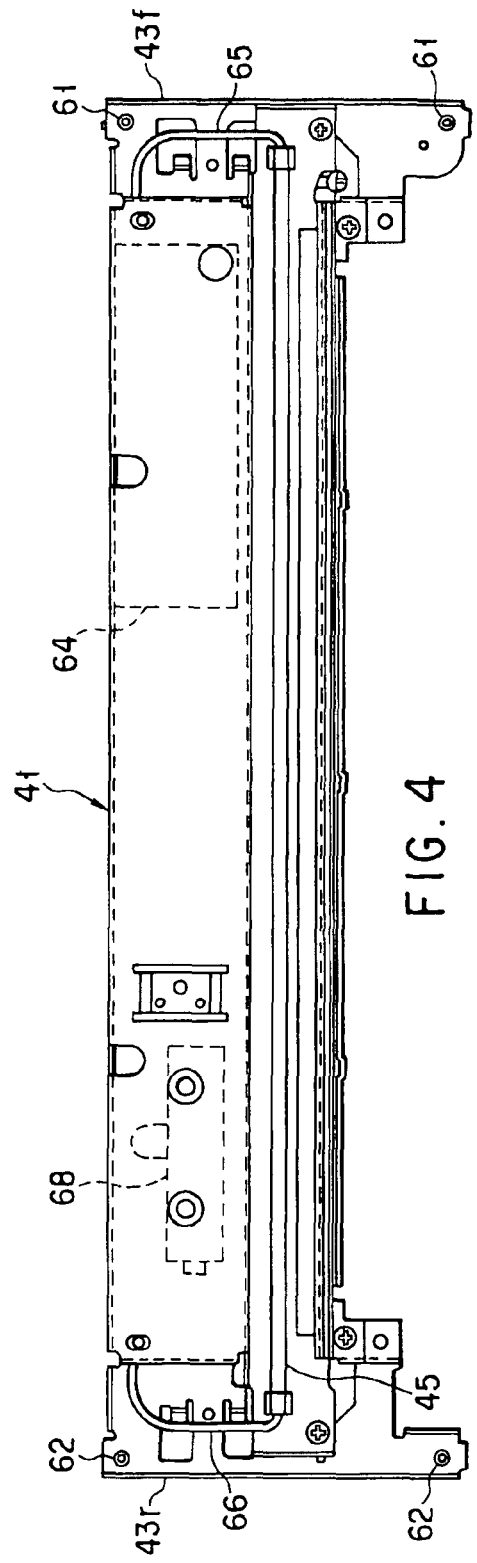

SCANNER UNIT AND CARRIAGE THEREFOR

BACKGROUND OF THE INVENTION

The present invention relates to a scanner unit mounted in a copying machine, etc., and more particularly to a carriage having a cold-cathode fluorescent lamp as a lamp for illuminating an original.

In general, a copying machine has a scanner unit for reading an image from an original, or an object to be copied. The scanner unit has, at its upper surface, a substantially horizontal original table glass for the mounting of the original.

First and second carriages, which extend along the original table glass from a front side to a rear side of the apparatus, that is, in a main scan direction, are disposed below the original table glass. The first carriage includes a lamp for illuminating the original placed on the original table glass, a reflector for converging light from the lamp onto the surface of the original, and a first mirror for deflecting the reflection light from the original at 90°. The second carriage has second and third mirrors for respectively deflecting the reflection light from the first mirror at 90°. The reflection light from the third mirror is guided to a light receiving element via a converging lens and photoelectrically converted to produce image data.

A plurality of rails extending in a sub-scan direction perpendicular to the main scan direction are provided on the front and rear sides of the scanner unit. Both ends of frames of the first and second carriages are placed on the rails and kept substantially horizontal. Each carriage is thus made slidable in the sub-scan direction along the rails.

Front-side end portions of the first and second carriages are coupled by means of a wire cable passed over a plurality of pulleys, and also rear-side end portions of the carriages are coupled by means of a wire cable passed over a plurality of pulleys. By driving the two wire cables, the first carriage is slid in the sub-scan direction at a constant speed along the rails, and the second carriage is slid in the sub-scan direction along the rails at a ½ speed, following the movement of the first carriage.

Recently, there is a demand for reduction in size of the scanner unit, and accordingly there is a tendency to use an elongated cold-cathode fluorescent lamp having a diameter of about 4 mm as the lamp disposed on the first carriage. The quantity of heat generated by the cold-cathode fluorescent lamp is relatively small, and it can be disposed near the original table glass without heating the original table glass. Since the cold-cathode fluorescent lamp can be disposed very close to the original table glass, the dimension of the scanner unit in the height direction can be reduced.

In addition, an inverter circuit board functioning as a lighting circuit for turning on the cold-cathode fluorescent lamp needs to be mounted on the first carriage. The inverter circuit board is attached to a substantially middle portion of the first carriage in the main scan direction, in consideration of a weight balance of the first carriage in the main scan direction.

The weight balance of the first carriage is important. If the weight balance is lost, a greater weight acts on one end portion of the carriage while both end portions of the carriage are pulled in the sub-scan direction by means of the wire cables. As a result, the frame of the carriage vibrates. If the frame vibrates, the first mirror disposed on the carrier vibrates accordingly, and a resultant image is adversely affected.

On the other hand, it is known that a leak current occurs from a high-voltage-side harness of the cold-cathode fluorescent lamp. Thus, if the inverter circuit board is disposed at a middle portion of the carriage, as in the prior art, the high-voltage-side harness extends up to the middle portion of the first carriage, and the amount of leak current increases. If the leak current increases, the amount of light of the lamp decreases and the quality of an obtained image deteriorates.

In order to solve this problem, there is an idea that an insulating material is wrapped around the surface of the high-voltage-side harness, with a view to preventing leak current from the high-voltage-side harness of the cold-cathode fluorescent lamp. However, if the insulating material is wrapped around the harness, the cost of material increases, giving rise to a further problem.

BRIEF SUMMARY OF THE INVENTION

The present invention has been made in consideration of the above problems, and its object is to provide a carriage with simple structure, which can suppress leak current from a cold-cathode fluorescent lamp and stably transmit reflection light from an original to a light receiving element, and a scanner unit having the carriage.

In order to achieve the object, the present invention provides a carriage comprising:

an electrically conductive frame disposed near an original surface of a substantially horizontally set original, and extending in a first direction in parallel with the original surface;

a cold cathode fluorescent lamp for illuminating the original surface, the cold cathode fluorescent lamp extending in the first direction and being disposed on the frame;

an optical member for guiding reflection light reflected by the original surface; and a lighting circuit, attached to one end portion of the frame near a positive electrode of the cold cathode fluorescent lamp, for lighting the cold cathode fluorescent lamp.

The invention also provides a carriage comprising:

a frame disposed near an original surface of a substantially horizontally set original, and extending in a first direction in parallel with the original surface;

a cold cathode fluorescent lamp for illuminating the original surface, the cold cathode fluorescent lamp extending in the first direction and being disposed on the frame;

an optical member for guiding reflection light reflected by the original surface;

a lighting circuit, attached to one end portion of the frame near a positive electrode of the cold cathode fluorescent lamp, for lighting the cold cathode fluorescent lamp; and a weight for stabilizing a weight balance in the first direction, the weight being attached on a side of the other end portion of the frame, which is distanced from the lighting circuit in the first direction.

The invention also provides a scanner unit comprising:

a carriage, which includes an electrically conductive frame disposed near an original surface of a substantially horizontally set original, and extending in a first direction in parallel with the original surface; a cold cathode fluorescent lamp for illuminating the original surface, the cold cathode fluorescent lamp extending in the first direction and being disposed on the frame; an optical member for guiding reflection light reflected by the original surface; a lighting circuit, attached to one end portion of the frame near a positive electrode of the cold cathode fluorescent lamp, for lighting the cold cathode fluorescent lamp; and a weight for stabilizing a weight balance in the first direction, the weight being attached on a side of the other end portion of the frame, which is distanced from the lighting circuit in the first direction;

two rails extending along the original surface in a second direction perpendicular to the first direction, the two rails supporting both the end portions of the frame such that the frame may slide in the second direction; and light receiving means for receiving the reflection light guided by the optical member.

BRIEF DESCRIPTION OF THE SEVERAL VIEWS OF THE DRAWING

FIG. 2 is a front view of the scanner unit;

FIG. 4 is a plan view of a first carriage mounted on the scanner unit;

DETAILED DESCRIPTION OF THE INVENTION

An embodiment of the present invention will now be described in detail with reference to the accompanying drawings.

Figure 1:
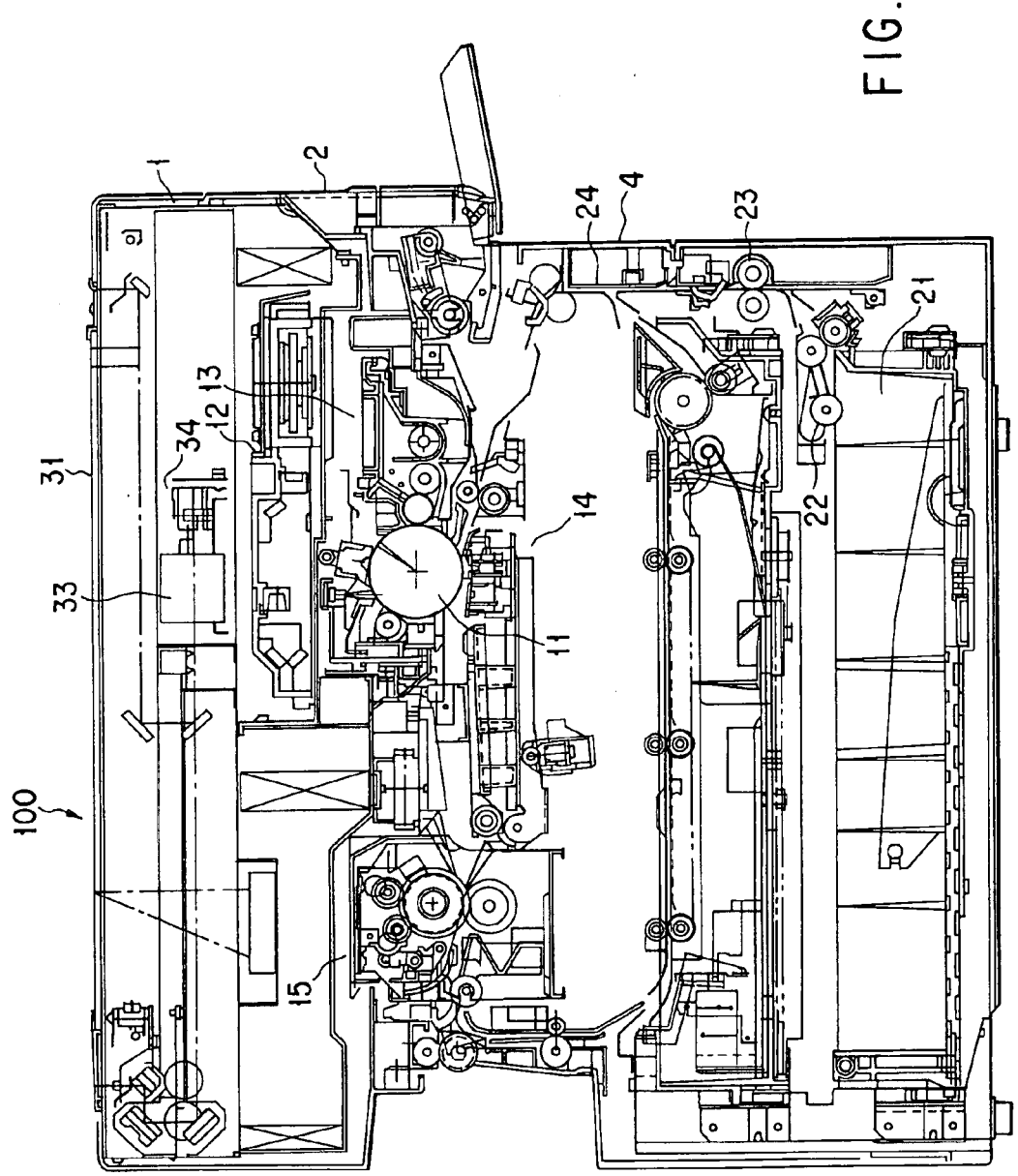
FIG. 1 schematically shows a copying machine having a scanner unit according to an embodiment of the invention.

FIG. 1 schematically shows the structure of a copying machine 100 in which a scanner unit 1 according to the embodiment of the invention is mounted.

The copying machine 100 comprises the scanner unit 1 for scanning an image of an original, an image forming section 2 for outputting a read image onto a paper sheet, and a sheet feed section 4 for feeding paper sheets to the image forming section 2.

The image forming section 2 comprises an exposure unit 12, a development unit 13, a transfer unit 14 and a fixing unit 15. The exposure unit 12 emits a laser beam on the basis of image data read from an original by the scanner unit 1 and causes the laser beam to expose and scan an outer peripheral surface of a photosensitive drum 11, thereby forming an electrostatic latent image on the outer peripheral surface of the photosensitive drum 11. The development unit 13 applies a developer to the outer peripheral surface of the photosensitive drum 11, thereby developing the electrostatic latent image. The transfer unit 14 transfers the developer image formed on the outer peripheral surface of the photosensitive drum 11 onto a paper sheet fed from the sheet feed section 4. The fixing unit 15 heats and presses the sheet, on which the developer image has been transferred, thereby fixing the developer image on the sheet.

The sheet feed section 4 comprises a sheet cassette 21 containing plural paper sheets, a pickup roller 22 provided at a right end portion (in the figure) of the sheet cassette 21, and a sheet convey path 24 including plural pairs of convey rollers 23 for conveying the paper sheet, which has been picked up from the sheet cassette 21 by the rotation of the pickup roller 22, to a transfer region between the outer peripheral surface of the photosensitive drum 11 and the transfer unit 14.

When an image on an original is to be copied onto a paper sheet, the pickup roller 22 is rotated to pick up a paper sheet from the sheet cassette 21 onto the sheet convey path 24. The paper sheet is conveyed to the transfer region by means of the plural pairs of convey rollers 23. At this time, a well-known image forming process is carried out in the image forming section 2, and a developer image formed on the outer peripheral surface of the photosensitive drum 11 is brought to the transfer region by the rotation of the photosensitive drum 11. The developer image thus brought to the transfer region is transferred onto the sheet by the transfer unit 14 and fixed on the sheet by heating and pressing by means of the fixing unit 15.

Figure 3:
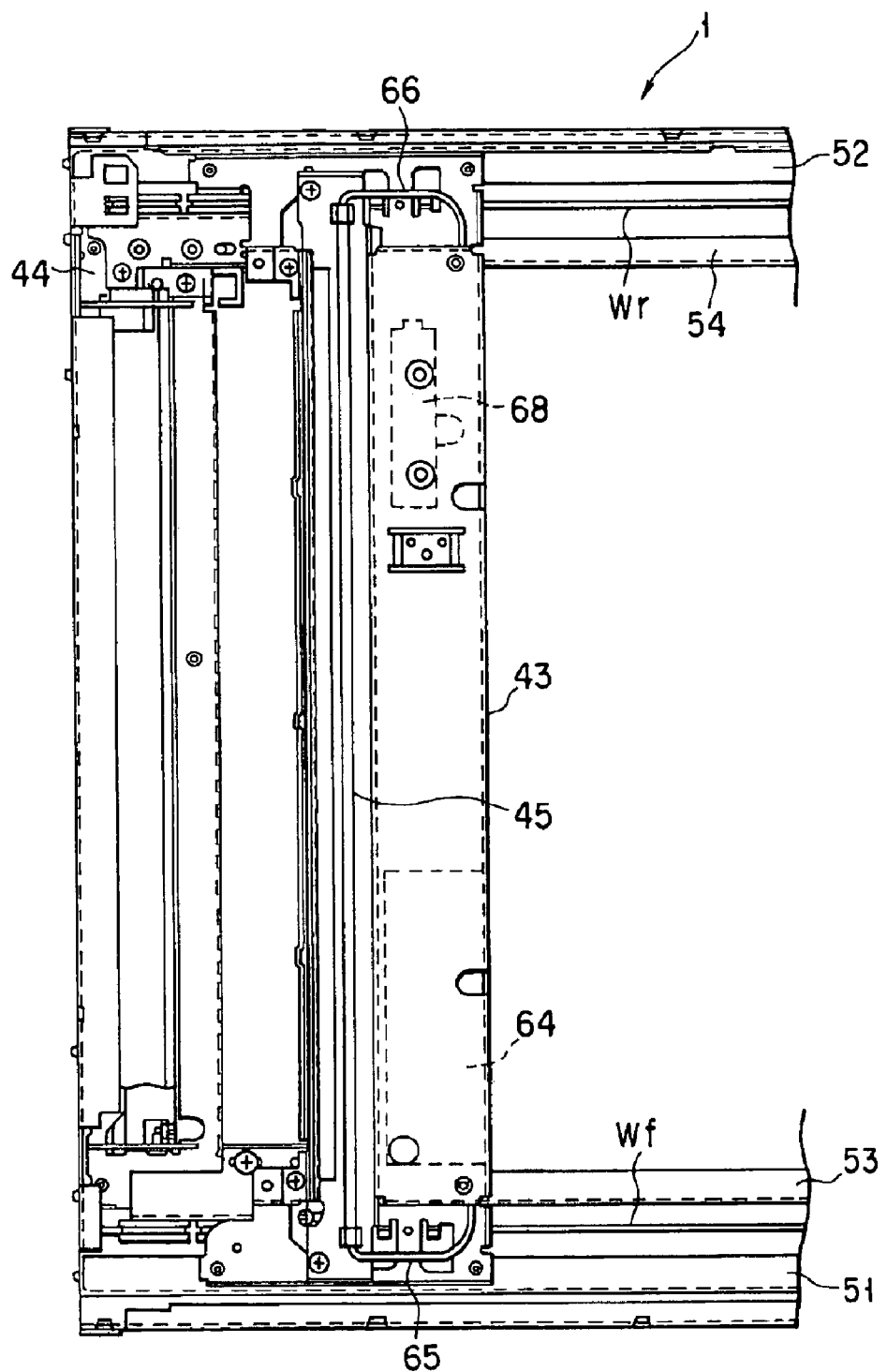
FIG. 3 is a plan view of a left-side end portion of the scanner unit.

The scanner unit 1 will now be described with reference to FIG. 2 and FIG. 3. FIG. 2 is a see-through view of the scanner unit 1, as viewed from the front side of the copying machine 100. FIG. 3 is a top plan view showing a left-side end portion (in FIG. 1) of the scanner unit 1.

The scanner unit 1 includes a substantially horizontal original table glass 31 for mounting of an original, and a substantially rectangular box-shaped case body 32 having the original table glass 31 at its top face. First and second carriages 41 and 42 extending from the front side to the rear side of the machine along the original table glass 31, that is, in the main scan direction (first direction), are disposed below the original table glass 31 within the case body 32. The first and second carriages 41 and 42 have first and second frames 43 and 44, respectively, which extend in the main scan direction. The frames 43 and 44 are formed of electrically conductive metal plates.

The first frame 43 is provided with a cold cathode fluorescent lamp 45 (to be described later in detail) for illuminating an original surface, i.e. a lower surface of an original placed on the original glass 31, a reflector for converging light from the cold cathode fluorescent lamp 45 onto the original surface, and a first mirror 47 for deflecting the reflection light from the original surface at 90° to the left direction (in the figure). The second frame 44 is provided with a second mirror 48 for deflecting the reflection light from the first mirror 47 downwards at 90°, and a third mirror 49 for deflecting the reflection light from the second mirror 48 at 90° to the right direction (in the figure).

The light reflected by the third mirror 49 to the right direction (in the figure) is guided to a CCD sensor 34 (light receiving means) via a converging lens 33 disposed at a predetermined position within the case body 32 (see FIG. 1). The reflection light is photoelectrically converted by the CCD sensor 34 to produce image data required in an image forming process in the image forming section 2.

Four rails 51, 52, 53 and 54 extending in a sub-scan direction (second direction) perpendicular to the main scan direction are provided at different levels along the original table glass 31 on the front and rear sides of the case body 32. A front-side end portion of the first frame 43 is placed on the front-side upper-level rail 51, and a rear-side end portion thereof is placed on the rear-side upper-level rail 52. Thus, the first carriage 41 is supported slidably in the sub-scan direction in parallel with the original table glass 31. On the other hand, a front-side end portion of the second frame 44 is placed on the front-side lower-level rail 53, and a rear-side end portion thereof is placed on the rear-side lower-level rail 54. Thus, the second carriage 42 is supported slidably in the sub-scan direction.

The first frame 43 of first carriage 41 and the second frame 44 of second carriage 42 are coupled by two wire cables Wf and Wr of the same length. The front-side end portions of the frames 43 and 44 are coupled by the wire cable Wf, and the rear-side end portions thereof are coupled by the wire cable Wr.

As is representatively shown in FIG. 2, the front-side wire cable Wf is passed over a pulley 55 fixed to the right-side wall of the case body 32, two pulleys 56 and 57 fixed to the front-side end portion of the second frame 44, a pulley 58 fixed to the left-side wall of the case body 32, and a drive pulley 59. The front-side wire cable Wf is fixed at one end to the left-side wall of the case body and at the other end to a frame 36 via a spring 35. The front-side end portion of the first frame 43 is fixed at a location on the wire cable Wr. The other wire cable Wr provided on the rear side of the machine functions similar with the front-side wire cable Wf.

If a motor (not shown) is driven to rotate the front-side and rear-side pulleys 59 in a predetermined direction at a predetermined rotational speed, the wire cables Wf and Wr are run at a predetermined speed. The first carriage 41 slides in the sub-scan direction along the rails 51 and 52 at the same speed as the wire cables, and the second carriage 42 slides along the rails 53 and 54 at half the speed.

Figure 5:
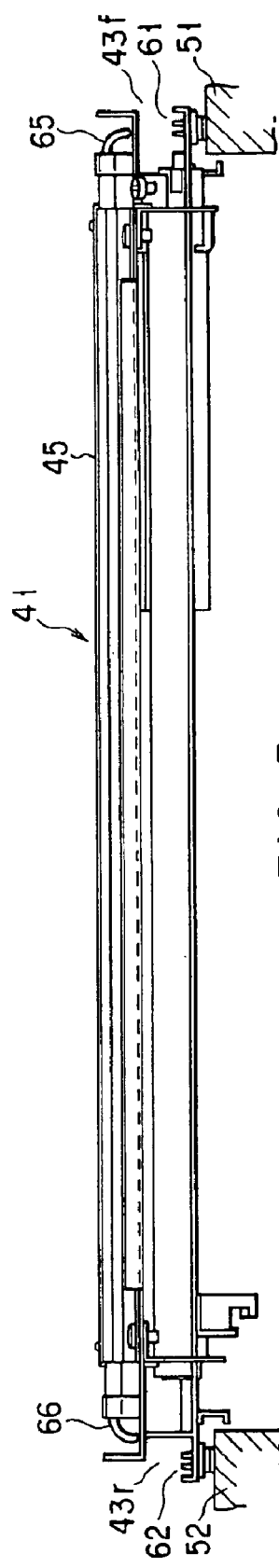
FIG. 5 is a side view of the first carriage, as viewed from the left side in FIG. 4.
Figure 6:
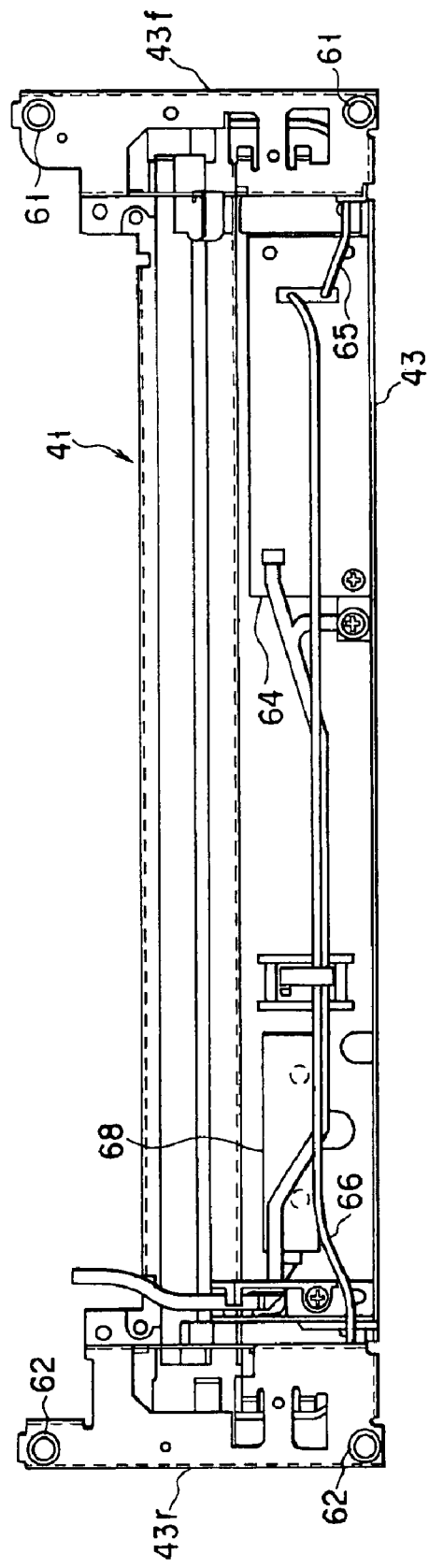
FIG. 6 is a bottom view of the first carriage shown in FIG. 4.

The first carriage 41 on which the cold cathode fluorescent lamp 45 is mounted will now be described in greater detail with reference to FIG. 4 to FIG. 6. FIG. 4 is a plan view of the first carriage 41. FIG. 5 is a side view of the first carriage 41, as viewed from the left side of the machine. FIG. 6 is a bottom view of the first carriage 41.

The first frame 43 of the first carriage 41 is formed of not a plastic material with low mechanical strength and unstable molding properties, but a metal plate with high mechanical strength and less deformability. A front-side end portion 43*f* and a rear-side end portion 43*r* of the first frame 43 are provided with slide pins 61 and 62, respectively, which function as contact points with the rails 51 and 52. The contact area between the first frame 43 and the rails 51 and 52 can be reduced by the slide pins 61 and 62. Thus, the first frame 43 can smoothly slide on the rails 51 and 52.

Since the first frame 43 is formed of the high-strength metal plate and both the end portions of the first frame 43 are provided with the pins 61 and 62 for reducing the area of contact with the rails 51 and 52, the first carriage 41 can stably be slid on the rails 51 and 52 in the sub-scan direction without causing undesirable vibration to the first frame 43.

The cold cathode fluorescent lamp 45 extending in the main scan direction is mounted on the first frame 43. In the case of the scanner unit capable of scanning an "A3" size original, the cold cathode fluorescent lamp 45 has a length of about 300 mm and a tube diameter of about 4 mm. Thus, the size of the cold cathode fluorescent lamp 45 is very small, the lifetime is long, the lamp current is small, and the power consumption is small. Accordingly, the amount of heat produced by the cold cathode fluorescent lamp 45 is small, and the original table glass 31 is not heated even if the lamp 45 is disposed near the original table glass 31. With the use of the cold cathode fluorescent lamp 45, there is no concern that the original table glass 31 may be heated. Moreover, the height of the first carriage 41 can be decreased and the size of the scanner unit 1 can be reduced.

An inverter circuit board 64 functioning as a lighting circuit for turning on the cold-cathode fluorescent lamp 45 is mounted on the first frame 43. In this embodiment, the inverter circuit board 64 is attached to a position as close as possible to a high-voltage-side end portion of the cold cathode fluorescent lamp 45, that is, a positive electrode side of the lamp. Specifically, since the positive electrode of the cold cathode fluorescent lamp 45 is disposed on the front side, the inverter circuit board 64 is attached to the position as close as possible to the front-side end portion 43*f* of the first frame 43. In a case where the positive electrode of the cold cathode fluorescent lamp 45 is located on the rear side, the inverter circuit board 64 is attached to a position near the rear-side end portion 43*r* of the first frame 43.

It is generally known that if an electrically conductor member is present in the vicinity of a high-voltage-side harness 65 of the cold cathode fluorescent lamp 45, a leak current occurs from the harness 65. It is also known that the amount of the leak current increases as the length of the high-voltage-side harness 65 increases. In this embodiment, the cold cathode fluorescent lamp 45 is mounted on the first frame formed of the metal plate. Thus, with a view to preventing a leak current from the high-voltage-side harness 65, the inverter circuit board 64 is positioned as close as possible to the high-voltage side of the cold cathode fluorescence lamp 45 and the high-voltage-side harness 65 is made as short as possible. The other harness 66 extended from the negative electrode side of the cold cathode fluorescent lamp 45 becomes inevitably longer than the high-voltage-side harness 65.

Thus, by making the high-voltage-side harness 65 as short as possible, occurrence of leak current can be suppressed, a considerable decrease in amount of light of the cold cathode fluorescent lamp 45 can be prevented, and degradation in image quality due to defective reading of the original can be prevented.

While the problem of leak current is solved by disposing the inverter circuit board 64 on the front side of the first frame 43, another problem arises. That is, the front-side end portion 43*f* of the first frame 43 becomes heavier than the rear-side end portion 43*r* and the balance in weight in the main scan direction of the first frame 43 is lost. If the balance in weight in the main scan direction of the first frame 43 is lost, the friction force between the relatively heavier front-side end portion 43*f* and the associated rail 51 becomes greater than the frictional force between the rear-side end portion 43*r* and the associated rail 52. Consequently, the front-side end portion 43*f* becomes difficult to slide and undesirable vibration occurs in the first frame 43.

If vibration occurs in the first frame 43, the optical elements mounted on the first carriage 41, in particular, the first mirror 47, would vibrate and reflection light from the original cannot stably be guided. This vibration will adversely affect a copy image and make it difficult to obtain a high-quality image.

Thus, in the present embodiment, in order to stabilize the weight balance in the main scan direction of the first frame 43, an original size sensor 68 serving also as a weight corresponding to the weight of the inverter circuit board 64 is attached to a position closer to the rear-side end portion 43*r* of the first frame 43. The original size sensor 68 may be replaced with a simple weight, or another weight may be attached in addition to the original size sensor 68. In addition, the position of attachment of the weight 68 in the main scan direction is adjusted to stabilize the weight balance in the main scan direction of the first frame 43.

As has been described above, in order to counter-balance the weight of the inverter circuit board 64 attached to the one end (front-side end portion 43*f*) of the first frame 43, the weight 68 is provided near the other end (rear-side end portion 43*r*) of the frame. Thus, the weight balance in the main scan direction of the first frame 43 can be stabilized. As a result, undesirable vibration is prevented from occurring when the first frame 43 is slid along the rails 51 and 52, and the reflection light from the original can stably be guided to the CCD sensor 34.

The present invention is not limited to the above embodiment, and various modifications may be made without departing from the spirit of the invention. For example, in the above-described embodiment, the weight 68 is attached on the opposite side of the inverter circuit board 64 in order to stabilize the weight balance of the first frame 43. However, instead of attaching the weight 68 near the rear-side end portion 43r, the wall thickness of the rear-side end portion 43r of the first frame 43 may be made greater than that of the front-side end portion 43f, thereby making their weights different in advance.

What is claimed is:

1. A carriage comprising:
   an electrically conductive frame disposed near an original surface of a substantially horizontally set original, and extending in a first direction in parallel with the original surface;
   a cold cathode fluorescent lamp for illuminating the original surface, the cold cathode fluorescent lamp extending in the first direction and being disposed on the frame;
   an optical member for guiding reflection light reflected by the original surface; and
   a lighting circuit, attached to one end portion of the frame near a positive electrode of the cold cathode fluorescent lamp, for lighting the cold cathode fluorescent lamp.

2. A carriage according to claim 1, wherein a weight for stabilizing a weight balance in the first direction is attached on a side of the other end portion of the frame, which is distanced from the lighting circuit in the first direction.

3. A carriage according to claim 2, wherein said weight comprises an original size sensor for sensing a size of the original.

4. A carriage according to claim 1, wherein a wall thickness of said one end portion of the frame is less than a wall thickness of the other end portion of the frame, which is distanced from the lighting circuit in the first direction, thereby to stabilize a weight balance in the first direction.

5. A carriage comprising:
   a frame disposed near an original surface of a substantially horizontally set original, and extending in a first direction in parallel with the original surface;
   a cold cathode fluorescent lamp for illuminating the original surface, the cold cathode fluorescent lamp extending in the first direction and being disposed on the frame;
   an optical member for guiding reflection light reflected by the original surface;
   a lighting circuit, attached to one end portion of the frame near a positive electrode of the cold cathode fluorescent lamp, for lighting the cold cathode fluorescent lamp; and
   a weight for stabilizing a weight balance in the first direction, said weight being attached on a side of the other end portion of the frame, which is distanced from the lighting circuit in the first direction.

6. A carriage according to claim 5, wherein the frame is electrically conductive.

7. A carriage according to claim 5, wherein said weight comprises an original size sensor for sensing a size of the original.

8. A carriage according to claim 5, wherein a wall thickness of said one end portion of the frame is less than a wall thickness of the other end portion of the frame, which is distanced from the lighting circuit in the first direction, thereby to stabilize a weight balance in the first direction.

9. A scanner unit comprising:
   a carriage, which includes an electrically conductive frame disposed near an original surface of a substantially horizontally set original, and extending in a first direction in parallel with the original surface; a cold cathode fluorescent lamp for illuminating the original surface, the cold cathode fluorescent lamp extending in the first direction and being disposed on the frame; an optical member for guiding reflection light reflected by the original surface; a lighting circuit, attached to one end portion of the frame near a positive electrode of the cold cathode fluorescent lamp, for lighting the cold cathode fluorescent lamp; and a weight for stabilizing a weight balance in the first direction, said weight being attached on a side of the other end portion of the frame, which is distanced from the lighting circuit in the first direction;
   two rails extending along the original surface in a second direction perpendicular to the first direction, the two rails supporting both the end portions of the frame such that the frame may slide in the second direction; and
   light receiving means for receiving the reflection light guided by the optical member.

10. A carriage according to claim 9, wherein said weight comprises an original size sensor for sensing a size of the original.

11. A carriage according to claim 9, wherein a wall thickness of said one end portion of the frame is less than a wall thickness of the other end portion of the frame, which is distanced from the lighting circuit in the first direction, thereby to stabilize a weight balance in the first direction.

12. A carriage comprising:
   an electrically conductive frame disposed near an original surface of a substantially horizontally set original, and extending in a first direction in parallel with the original surface;
   a cold cathode fluorescent lamp for illuminating the original surface, the cold cathode fluorescent lamp extending in the first direction and being disposed on the frame; and
   a lighting circuit, attached to one end portion of the frame near a positive electrode of the cold cathode fluorescent lamp, for lighting the cold cathode fluorescent lamp.

* * * * *